United States Patent [19]
Schwenk

[11] 3,869,164
[45] Mar. 4, 1975

[54] VEHICLE WITH IMPACT-ABSORBING END PORTION

[75] Inventor: Kurt Schwenk, Wolfsburg, Germany

[73] Assignee: Volkswagenwerk Aktiengesellschaft, Wolfsburg, Germany

[22] Filed: Apr. 18, 1973

[21] Appl. No.: 352,323

[30] Foreign Application Priority Data
Apr. 19, 1972  Germany................ 2218927

[52] U.S. Cl................. 293/63, 293/71 R, 267/140
[51] Int. Cl. ............................................ B60r 19/08
[58] Field of Search ............... 293/1, 60, 62, 63, 64, 293/65, 66, 67, 69 R, 69 V, 70, 71 R, 71 P, 80, 81, 82, 83, 85, 86, 87, 88, 95, 97, 99; 267/116, 139, 140; 296/28 R, 31 P

[56] References Cited
UNITED STATES PATENTS
2,074,469  3/1937  Haynes ............................. 293/63
2,965,403  12/1960  Barenyi et al..................... 293/63

FOREIGN PATENTS OR APPLICATIONS
1,289,441  2/1969  Germany ......................... 293/63
821,254  10/1959  Great Britain ................... 293/63

*Primary Examiner*—M. Henson Wood, Jr.
*Assistant Examiner*—Robert Saifer
*Attorney, Agent, or Firm*—Brumbaugh, Graves, Donohue & Raymond

[57]  ABSTRACT

A vehicle, such as an automobile, having a body designed to yield upon impact at at least one end portion thereof, and having impact absorbing apparatus, including a bumper, arranged entirely within the end portion. The end portion is constructed so as to yield in such a manner that any significant energy dissipation occurs only upon deformation of the impact absorbing apparatus. The end portion is preferably formed of at least one resilient member made of soft plastic material that yields upon impact.

7 Claims, 2 Drawing Figures

VEHICLE WITH IMPACT-ABSORBING END PORTION

BACKGROUND OF THE INVENTION

Most presently manufactured motor vehicles are equipped with impact absorbing apparatus, such as bumpers, located outside of the vehicle body, both ahead of the front end and behind the rear end of the vehicle. Such impact absorbing apparatus, however, generally does not function with equivalent effectiveness over a wide range of impact loads. For example, to minimize the injuries to a pedestrian who is struck by a motor vehicle provided with conventional impact absorbing apparatus, the apparatus must be provided a relatively soft outer surface. At the same time, the end portion of the vehicle body adjacent the impact absorbing apparatus must be comparatively rigid to provide the energy dissipation necessary to protect passengers in the motor vehicle upon application of a more substantial impact load, for example, by colliding with another motor vehicle or a tree. As a result, a relatively moderate impact causes major deformation of the end portion of the vehicle body and necessitates extensive and expensive repair work on the vehicle body.

While some recently manufactured motor vehicles have been equipped with self-regenerating, impact absorbing apparatus, such apparatus is still located outside the vehicle body and presents an ungainly and relatively unattractive appearance. In addition, the apparatus is intended to provide energy dissipation upon the application of moderate impact loads and is generally not concerned with providing a soft surface to minimize the effects of a motor vehicle-pedestrian collision, for example.

SUMMARY OF THE INVENTION

The present invention is a vehicle with an improved impact absorbing end portion that presents a comparatively soft surface to produce minimal injuries to a pedestrian struck by the vehicle and also provides the necessary energy dissipation in the event of more substantial impact loads. The vehicle body is designed to yield upon impact at at least one end portion and the vehicle has impact absorbing apparatus, including a bumper, arranged at the one end portion of the body. The impact absorbing apparatus is arranged entirely within the end portion of the vehicle body and the end portion is constructed so as to yield in such a manner that any significant energy dissipation occurs only upon deformation of the impact absorbing apparatus.

The vehicle end portion is formed of resilient plastic material and extends entirely across the end of the vehicle and partially down the length of the vehicle. Inside and toward the bottom of the vehicle end portion, a rigid bumper extends transversely across the width of the vehicle and is coupled to an energy absorbing element, which is attached to the vehicle frame. The energy absorbing element may consist, for example, of a hydraulically operated piston which permits the bumper to move in response to an impact load and is capable of then moving the bumper back to its normal position after the impact. The inventive end portion may be used at either end of a vehicle, such as an automobile, railway car, or other vehicle likely to sustain impact loads.

In a preferred embodiment of a front end portion according to the invention, the vehicle headlights are mounted on the rigid bumper so as to move with the bumper upon the application of an impact load. A transversely extending opening in the vehicle end portion permits the light from the headlights to illuminate the area in front of the motor vehicle. The end portion may also be formed in an aesthetically pleasing configuration, while the bumper, being enclosed by the end portion, is formed solely with regard to utility and without regard to its appearance. The end portion is also releasably coupled to the remainder of the vehicle body so that following an impact, any parts of the end portion which may be damaged can be quickly and easily replaced, without replacing any portions of the rest of the body.

As the preceding description shows, the inventive vehicle with impact absorbing end portions provides both a relatively soft surface for relatively small impact loads, such as striking a pedestrian, and an impact absorbing capacity for dissipating the energy from relatively larger impact loads, while avoiding damage to the remainder of the vehicle body. Furthermore, the inventive end portion may be configured to provide an aesthetically pleasing appearance without affecting the energy absorbing utility of the associated impact absorbing apparatus.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF A PREFERRED EMBODIMENT

Figure 1:
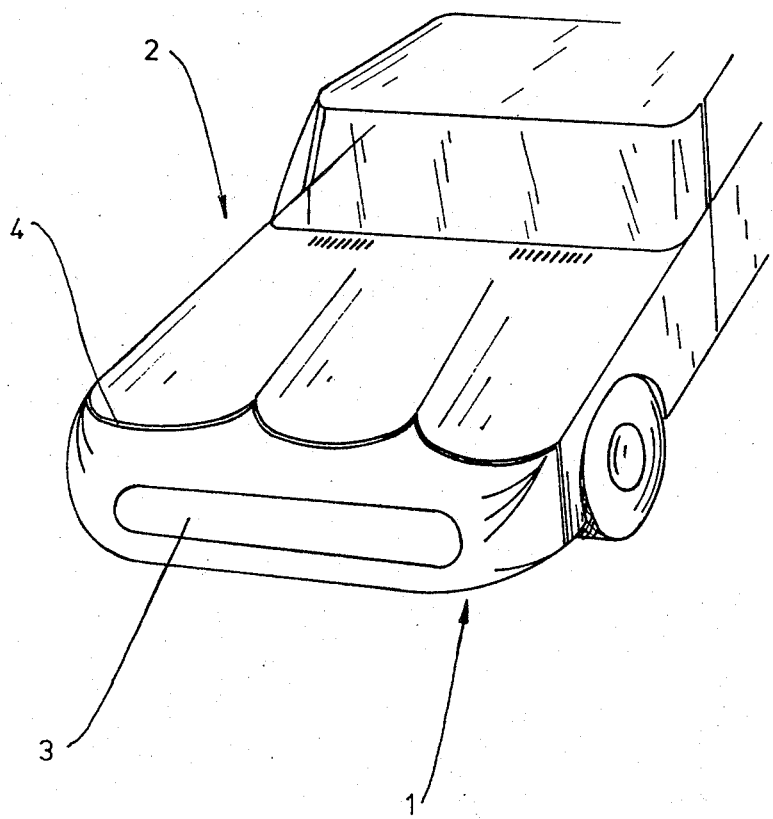
FIG. 1 is a perspective view of a vehicle according to the invention.

In the automobile shown in FIG. 1, a resilient end portion, generally designated by the reference numeral 1, is detachably connected to the rest of a motor vehicle body 2. The front end portion 1 extends entirely across the width of the motor vehicle and also part way along the length of the motor vehicle, both along its sides and along its upper and lower exterior surfaces. An oblong opening 3 is provided generally in the center of the end portion 1, extending transversely across the width of the motor vehicle. As will be described hereinafter, the lights, horns, and other devices for the motor vehicle are provided behind the front end portion 1, the lights in particular being in general alignment with the opening 3. The front end portion 1 is connected to the main, steel portion of the motor vehicle body in the general area of the wheel housings, the fenders, and the inner plates. The connection is made in any convenient manner, such as with bolts and nuts or clips, which will permit the end portion 1 to be quickly and conveniently removed for replacement, for example, without also requiring the removal and replacement of the metal parts of the rest of the motor vehicle body. Such a detachable connection is of particular value in a motor vehicle equipped with front and rear end portions according to the invention, since the rest of the motor vehicle may be fabricated of relatively thick, and therefore more costly, metal parts with less consideration for the energy absorbing deformation characteristics of the parts.

Since the front end portion 1 is separate from the rest of the motor vehicle body 2, there will be a visible joint 4 between the front end portion 1 and the rest of the motor vehicle body 2. FIG. 1 illustrates how the joint 4 may be made aesthetically pleasing by providing corresponding scallops in the adjacent edges of the end portion 1 and the rest of the motor vehicle body 2.

Figure 2:
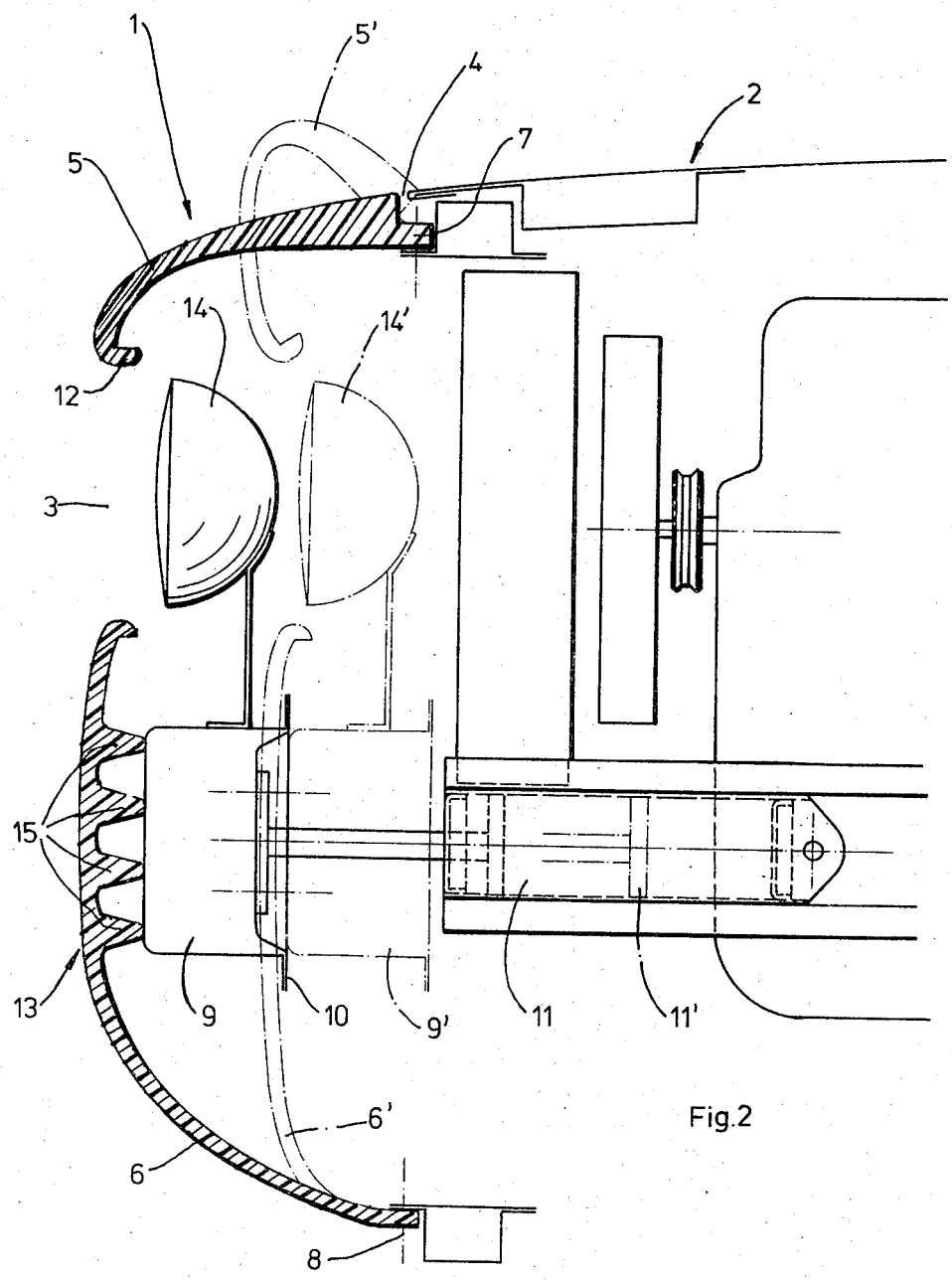
FIG. 2 is a sectional view of the front end portion of the motor vehicle of FIG. 1.

As shown in FIG. 2, the front end portion 1 preferably consists of several parts, including curved and hood-shaped upper and lower members 5 and 6. The upper and lower members 5 and 6 are detachably connected to the rest of the motor vehicle body 2 along their edges 7 and 8, respectively. Since the upper and lower members 5 and 6 are formed of resilient plastic material, they will assume the positions shown in phantom and designated 5' and 6', upon the application of an impact load. The upper member 5 of the end portion 1 is free to assume the position designated 5' upon the application of an impact load, whereas a bumper 9 must be deflected to permit the lower member 6 to assume the position 6'. Consequently, transversely extending and inwardly projecting ridges 15 are provided on the inner surface of the lower member 6 adjacent the bumper 9. The tops of the ridges 15 contact the front surface of the bumper 9 and support the main portion of the lower member 6 at a predetermined distance from the front surface of the bumper 9. Thus, upon the application of a relatively small impact load, the ridges 15 will deform, for example by flattening out, and permit movement of the lower member 6 without movement of the bumper 9.

The bumper 9 extends transversely across the front of the motor vehicle and comprises one part of the impact absorbing apparatus associated with the vehicle end portion 1. The bumper 9 is preferably manufactured of a rigid material, such as steel, to permit the bumper to transmit an impact load to an energy absorbing element 11, such as a hydraulically operated piston, located behind the bumper 9 and secured to the frame of the motor vehicle. Since the bumper 9 is enclosed and substantially hidden by the end portion lower member 6, the bumper 9 may be manufactured in the most practical and effective manner and shape, without regard to its appearance. For example, the chrome plating often applied to conventional, exposed bumpers to enhance their appearance may be dispensed with and the bumpers merely treated, in any convenient manner, to resist corrosion.

In the illustrated embodiment, the bumper 9 has a generally C-shaped cross-section with outwardly extending flanges adjacent the opening in the C-shaped cross-section. At each point along the bumper 9 at which the bumper is coupled to an energy absorbing element 11, the opening in the C-shaped cross-section of the bumper 9 is closed off by a rigid, profiled cap member 10. The cap member 10 has outwardly extending flanges which are aligned with the flanges on the bumper 9 for connecting the cap member 10 to the bumper 9, for example, by welding. The inward face of the cap member 10 receives a plate or disc attached to one end of a rod extending from the energy absorbing element 11. The plate or disc is connected to the inward face of the cap member 10 by bolts and nuts, for example. The rod from the plate or disc extends back to a conventional hydraulically operated piston enclosed in a cylindrical housing. The end of the piston housing is preferably secured to the vehicle frame.

The energy absorbing piston is preferably double acting so that it will permit the bumper 9 to deflect, or move to the right as viewed in FIG. 2, upon the application of an impact load and then return the bumper 9 to its normal position, or move to the left as viewed in FIG. 2, after the impact. Such a double acting or self-regenerating energy absorbing apparatus will also assist in restoring the end portion lower member 6 from its deflected position 6' to its normal position. The positions of the bumper 9 and the piston upon the application of an impact load are shown in phantom in FIG. 2 and are designated by the numerals 9' and 11', respectively. FIG. 2 also illustrates how the ridges 15 on the lower member 6 of the front end portion 1 have been compressed by the impact load.

In order to reduce the initial effect of an impact load on the bumper 9, for example, to help prevent deformation of the front surface of the bumper 9 resulting from a sharply applied or concentrated load, the front surfaces 12 and 13 of the upper and lower end portion members 5 and 6 may be reinforced. Such reinforcement will provide protection for the bumper 9, without substantially interfering with the intended purpose of the resilient end portion 1.

As shown in FIG. 2, the lights 14 for the motor vehicle may be arranged behind the end portion 1 in alignment with the oblong opening 3 in the end portion 1. In the preferred embodiment of the invention, the lights 14, only one of which is shown, are mounted on the upper surface of the bumper 9 so that the lights will move with the bumper 9 upon the apllication of an impact load. As viewed in FIG. 2, the light 14 will move to the right to assume the position shown in phantom and designated by the numeral 14'. If the front surface of the bumper 9 projects slightly beyond the most forward part of the light 14, the preferred light arrangement will effectively decrease the possibility of damage to the light 14.

It will be understood that the embodiment described above is merely exemplary and that those skilled in the art may make many variations and modifications without departing from the spirit and scope of the invention. In particular, the various parts comprising the inventive front or rear vehicle end portion may assume any aesthetically pleasing shape while still performing their intended function. All such modifications and variations are intended to be within the scope of the invention as defined in the appended claims.

I claim:

1. In a vehicle, such as an automobile, having a body and, mounted adjacent at least one end of the body, impact absorbing means including a bumper oriented transversely of the body, the improvement comprising an end portion for the body rigidly connected to the remainder of the body adjacent said one end and extending in a smooth surficial transition from the remainder of the body longitudinally of the vehicle beyond the impact absorbing means so that the impact absorbing means is arranged entirely within said end portion of the body, the end portion being distinct and separate from the bumper and deformable independently of the impact absorbing means and being constructed so as to yield in such a manner that significant energy dissipation occurs only upon deformation of said impact absorbing means.

2. The vehicle defined in claim 1, wherein said end portion includes at least one member, that is detachably connected to the remainder of said body.

3. The vehicle defined in claim 1, wherein said end portion includes at least one resilient member formed of soft plastic material which yields upon impact.

4. The vehicle defined in claim 1, wherein said end portion comprises at least one member defining a hood.

5. The vehicle defined in claim 1, wherein at least one light is arranged within said body behind an opening in said end portion.

6. The vehicle defined in claim 5, wherein said light is secured to said bumper.

7. The vehicle defined in claim 1, wherein said impact absorbing means is self-regenerating.

* * * * *